(12) United States Patent
Chau

(10) Patent No.: US 11,313,535 B2
(45) Date of Patent: Apr. 26, 2022

(54) PHOTOELECTRIC DEVICE

(71) Applicant: Chi-Yuen Chau, Taichung (TW)

(72) Inventor: Chi-Yuen Chau, Taichung (TW)

( * ) Notice: Subject to any disclaimer, the term of this patent is extended or adjusted under 35 U.S.C. 154(b) by 0 days.

(21) Appl. No.: 17/009,707

(22) Filed: Sep. 1, 2020

(65) Prior Publication Data

US 2021/0071844 A1   Mar. 11, 2021

Related U.S. Application Data

(60) Provisional application No. 62/896,587, filed on Sep. 6, 2019.

(51) Int. Cl.
| | | |
|---|---|---|
| *F21V 7/05* | (2006.01) | |
| *F21K 9/62* | (2016.01) | |
| *F21S 9/03* | (2006.01) | |
| *F21K 9/68* | (2016.01) | |
| *F21Y 115/10* | (2016.01) | |

(52) U.S. Cl.
CPC ............... *F21V 7/05* (2013.01); *F21K 9/62* (2016.08); *F21K 9/68* (2016.08); *F21S 9/037* (2013.01); *F21Y 2115/10* (2016.08)

(58) Field of Classification Search
CPC .......... G02B 6/0096; F21V 7/05; F21S 9/037; F21K 9/62; F21K 9/68
See application file for complete search history.

(56) References Cited

U.S. PATENT DOCUMENTS

| | | | | |
|---|---|---|---|---|
| 6,948,831 | B1* | 9/2005 | Naqvi | F21S 8/02 362/802 |
| 7,891,840 | B1* | 2/2011 | Kang | G02F 1/133603 362/249.02 |
| 2003/0198052 | A1* | 10/2003 | Witkowski | F21V 7/005 362/297 |
| 2011/0134648 | A1* | 6/2011 | Lin | G02B 27/0927 362/311.06 |
| 2011/0227486 | A1* | 9/2011 | Harada | F21K 9/00 315/158 |
| 2011/0317418 | A1* | 12/2011 | Burrell, IV | F21K 9/60 362/241 |
| 2012/0248989 | A1* | 10/2012 | Ikami | H01L 31/02019 315/151 |
| 2021/0048169 | A1* | 2/2021 | Dahlen | F21S 8/026 |

* cited by examiner

*Primary Examiner* — Rajarshi Chakraborty
*Assistant Examiner* — Steven Y Horikoshi
(74) *Attorney, Agent, or Firm* — JCIPRNET

(57) ABSTRACT

A photoelectric device including at least five plates and at least one light source is provided. The at least five plates are assembled together to form a chamber. The at least five plates include at least two of a solar panel, a reflective plate, and a light-transmitting plate. The at least one light source is embedded in the at least one of the at least five plates.

6 Claims, 4 Drawing Sheets

PHOTOELECTRIC DEVICE

CROSS-REFERENCE TO RELATED APPLICATION

This application claims the priority benefit of U.S. provisional application Ser. No. 62/896,587, filed on Sep. 6, 2019. The entirety of the above-mentioned patent application is hereby incorporated by reference herein and made a part of this specification.

BACKGROUND

Technical Field

The disclosure relates to a photoelectric device.

Description of Related Art

Currently, photoelectric devices on the market have been developed quite maturely, but there are still problems to be improved or solved. Taking solar panels as an example, currently the solar panels on the market mainly use sunlight to generate electricity. The more power generation required, the more solar panels required, and the larger the space occupied by the solar panels. However, there may not be enough space outdoors to dispose these solar panels, and with the influence of sunshine time, latitude, or shelters, the amount of power generated by the solar panels may be below expectations. In addition, taking illumination devices as an example, currently the illumination devices on the market mostly use high-power light sources to increase the brightness of the illumination, the distance of the light projection, or the range of the illumination, etc. However, this method consumes more energy.

SUMMARY

The disclosure provides a photoelectric device capable of effectively amplifying the energy of output light, thereby contributing to improving the problems.

A photoelectric device of the disclosure includes at least five plates and at least one light source. The at least five plates are assembled together to form a chamber. The at least five plates include at least two of a solar panel, a reflective plate, and a light-transmitting plate. The at least one light source is embedded in the at least one of the at least five plates.

In an embodiment of the disclosure, the chamber is hollow.

In an embodiment of the disclosure, the outer surface of at least one plate in the photoelectric device is formed with an optical layer, a plurality of microstructures, or a combination therewith.

In an embodiment of the disclosure, the light receiving surface of the solar panel faces the inside of the chamber.

In an embodiment of the disclosure, at least one plate in the photoelectric device is a composite plate.

In an embodiment of the disclosure, the inner surface of the reflective plate is a flat surface, a concave surface, a curved surface, or a combination of at least two of the above.

In an embodiment of the disclosure, the photoelectric device is in the form of a polygonal cylinder. The at least five plates include a front plate, a back plate, a first side plate, a second side plate, and a bottom plate. The front plate and the back plate are the reflective plates. The first side plate and the second side plate are the solar panels. The bottom plate is the solar panel, the reflective plate, or the light-transmitting plate.

In an embodiment of the disclosure, the photoelectric device is an illumination device. The bottom plate is a light-transmitting plate. At least one of the inner surface and the outer surface of the bottom plate is a rough surface or is formed with a plurality of microstructures.

In an embodiment of the disclosure, the at least one light source includes at least one light-emitting element and an optical device. The at least one light-emitting element is adapted to output a beam. The optical device is disposed on the transmission path of the beam and includes a conductive chamber, a first optical module, a second optical module, and a third optical module. The conductive chamber has a light-entrance end. The first optical module is fixed in the conductive chamber and adjacent to the light-entrance end. The second optical module is fixed in the conductive chamber. The first optical module is located between the light-entrance end and the second optical module. The conductive chamber, the first optical module, and the second optical module together define a first resonant space. The third optical module is fixed in the conductive chamber. The second optical module is located between the first optical module and the third optical module. The conductive chamber, the second optical module, and the third optical module together define a second resonant space.

In an embodiment of the disclosure, the at least one light-emitting element includes at least one light-emitting diode.

In order to make the above features and advantages of the disclosure comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
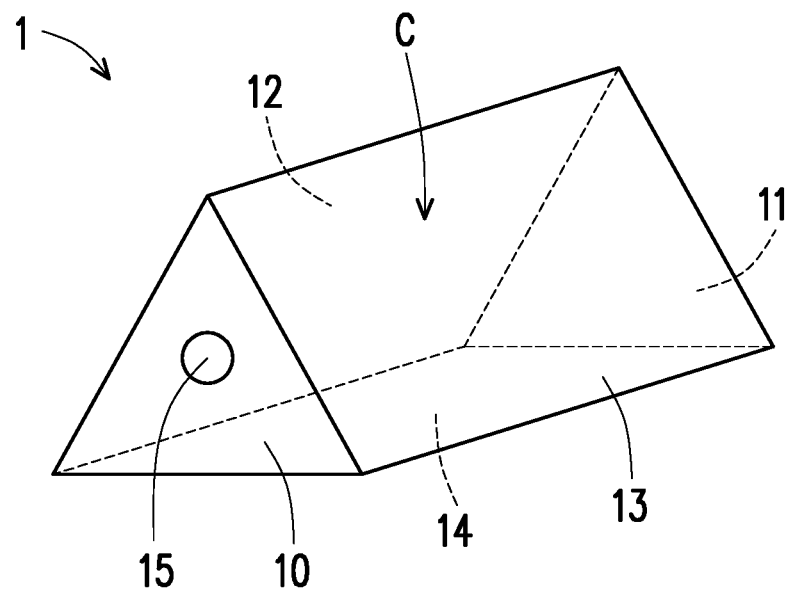
FIG. 1 is a schematic view of a photoelectric device according to the first embodiment of the disclosure.

In the following embodiments, wordings used to indicate directions, such as "up," "down," "front," "back," "left," and "right," merely refer to directions in the accompanying drawings. Therefore, the directional terms are used to illustrate rather than limit the disclosure.

In the accompanying drawings, the drawings illustrate the general features of the methods, structures, or materials used in the particular exemplary embodiments. However, the drawings shall not be interpreted as defining or limiting the scope or nature covered by the exemplary embodiments. For example, the relative size, thickness and location of layers, regions, and/or structures may be reduced or enlarged for clarity.

In the embodiments, the same or similar elements will be designated by the same or similar reference numerals, and descriptions thereof will be omitted. In addition, the features of different exemplary embodiments may be combined with each other when they are not in conflict, and simple equivalent changes and modifications made according to the specification or the claims are still within the scope of the disclosure.

The terms such as "first" and "second" mentioned in the specification or the claims are only used to name discrete elements or to distinguish different embodiments or scopes and are not intended to limit the upper or lower limit of the number of the elements, nor are they intended to limit the manufacturing order or disposition order of the elements. In addition, the disposition of one element/film layer on (or above) another element/film layer may encompass that the element/film layer is directly disposed on (or above) the another element/film layer, and the two elements/film layers are in direct contact with each other; and the element/film layer is indirectly disposed on (or above) the another element/film layer, and there are one or more elements/film layers between the two elements/film layers.

In an embodiment of the disclosure, the photoelectric device includes at least five plates and at least one light source. The at least five plates are assembled together to form a chamber. The at least one light source is embedded in at least one of the at least five plates. Each of the plates has an inner surface and an outer surface. The inner surface is the surface of each of the plates facing the inside of the chamber, and the outer surface is the surface of each of the plates facing the outside of the chamber. The at least five plates include at least two of a solar panel, a reflective plate, and a light-transmitting plate. In other words, one of the at least five plates may be selected from one of a solar panel, a reflective plate, and a light-transmitting plate; another of the at least five plates may be selected from another of a solar panel, a reflective plate, and a light-transmitting plate; and the remaining of the at least five plates may be other types of plates; or the remaining of the at least five plates may also be selected from solar panels, reflective plates, and light-transmitting plates.

The following embodiments are described in detail with reference with the accompanying drawings.

FIG. 1 is a schematic view of a photoelectric device 1 according to the first embodiment of the disclosure. Referring to FIG. 1, the photoelectric device 1 includes five plates (e.g., a front plate 10, a back plate 11, a first side plate 12, a second side plate 13, and a bottom plate 14) and a light source 15. The front plate 10, the back plate 11, the first side plate 12, the second side plate 13, and the bottom plate 14 are assembled together to form a chamber C. For example, the front plate 10, the back plate 11, the first side plate 12, the second side plate 13, and the bottom plate 14 may be fixed together by engagement, locking, adhesion, or other suitable methods to be in the form of a triangle cylinder as shown in FIG. 1. One of the long sides of the first side plate 12 is connected to one of the long sides of the second side plate 13, the bottom plate 14 is connected between another long side of the first side plate 12 and another long side of the second side plate 13, and the front plate 10 and the back plate 11 are respectively fixed to the opposite ends of the first side plate 12, the second side plate 13 and the bottom plate 14, but the disclosure is not limited thereto. In other embodiments, the photoelectric device may include more plates, and these plates may be assembled to be in the form of other types of polygonal cylinders.

In some embodiments, the chamber C is hollow, that is, the inside of the chamber C may not be provided with a filling material. In some embodiments, the light transmission medium in the chamber C may be air, that is, the refractive index of the light transmission medium in the chamber C may be 1.

In some embodiments, the front plate 10 and the back plate 11 may be reflective plates. In the specification, the reflective plate may be a metal plate (e.g., an aluminum plate or a stainless steel plate, but the disclosure is not limited thereto) or a light-transmitting plate (e.g., a glass plate or a plastic plate, but the disclosure is not limited thereto) with a reflective layer formed thereon, and the reflective layer may face the inside of the chamber C. In addition, the inner surface of the reflective plate may be a flat surface, a concave surface, a curved surface, or a combination of at least two of the above. The light source 15 may be embedded in the front plate 10 and output a beam toward the inside of the chamber C, but the disclosure is not limited thereto. In other embodiments, the number of the light source 15 may be greater than one, and multiple light sources may be embedded in one or more reflective plates in the photoelectric device 1.

In some embodiments, the first side plate 12 and the second side plate 13 may be solar panels. The solar panel may be any kind of solar panels, such as a silicon-based solar panel, a thin-film solar panel, or an organic material solar panel, but the disclosure is not limited thereto. The light receiving surface of the solar panel may face the inside of the chamber C to receive the light output from the light source 15 and convert the light energy into electrical energy.

In some embodiments, the bottom plate 14 may be a solar panel, a reflective plate, or a light-transmitting plate. When the bottom plate 14 is a solar panel, the bottom plate 14 together with the first side plate 12 and the second side plate 13 are adapted to generate electricity. When the bottom plate 14 is a reflective plate, the bottom plate 14 together with the front plate 10 and the back plate 11 are adapted to reflect light, so that the energy of the light entering the chamber is amplified through reflection and diffraction, and thereby the solar panels (e.g., the first side plate 12 and the second side plate 13) receive more light. When the photoelectric device 1 needs to provide an illumination function, the bottom plate 14 may be a light-transmitting plate, and the light in the chamber C is output from the photoelectric device 1 through the bottom plate 14. In such a structure, at least one of the inner surface and the outer surface of the bottom plate (light-transmitting plate) may be a rough surface to homogenize the beam, or at least one of the inner surface and the outer surface of the bottom plate (light-transmitting plate) may be formed with multiple microstructures to achieve the desired illumination effect.

Figure 2:
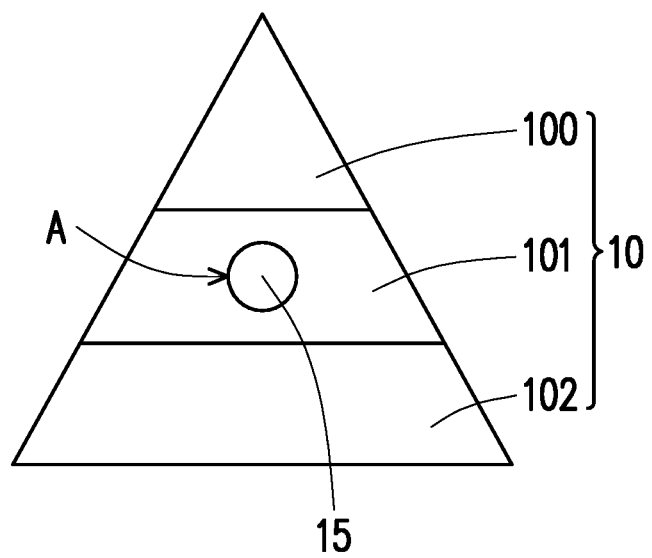
FIG. 2 is another front view of the front plate of FIG. 1

FIG. 1 schematically illustrates that the front plate 10, the back plate 11, the first side plate 12, the second side plate 13, and the bottom plate 14 are all a single plate. However, in other embodiments, at least one plate in the photoelectric device 1 may be a composite plate. FIG. 2 is another front view of the front plate 10 of FIG. 1. As shown in FIG. 2, the front plate 10 may also be a composite plate formed by combining a first sub-plate 100, a second-sub plate 101, and a third sub-plate 102. The combining method for combining the first sub-plate 100, the second sub-plate 101, and the third sub-plate 102 may include engagement, locking, adhesion, or other suitable methods. In FIG. 2, the second sub-plate 101 is disposed between the first sub-plate 100 and the third sub-plate 102, and the center of the second sub-plate 101 is formed with an opening A for accommodating the light source 15. However, in other embodiments, design parameters such as the position of the opening A, the number or the arrangement of multiple sub-plates, or the shape of each of the sub-plates may be changed according to the requirements, and other plates in the photoelectric device 1 may also be composite plates, which is not iterated here.

Referring to FIG. 1 again, because solar panels (e.g., the first side plate 12, the second side plate 13, and/or the bottom plate 14) may use the light output from the light source 15 to generate electricity and may generate electricity without relying on sunlight, the photoelectric device 1 may be disposed not only outdoors but indoors. In other words, the position where the photoelectric device 1 is disposed is not limited to an area that the sunlight irradiates, and the power generation of the photoelectric device 1 may not be affected by sunshine time, latitude, shelters, etc.

When the photoelectric device 1 is disposed outdoors, the multiple plates (e.g., multiple plates of the front plate 10, the back plate 11, the first side plate 12, the second side plate 13, and the bottom plate 14) of the photoelectric device 1 are capable of withstanding environmental impacts (e.g., strong wind, falling snow . . . ). In addition, the outer surface of at least one plate (e.g., at least one of the front plate 10, the back plate 11, the first side plate 12, the second side plate 13, and the bottom plate 14) of the photoelectric device 1 may be selectively formed with an optical layer, multiple microstructures, or a combination therewith, to achieve the required optical effects (e.g., anti-reflection effects, but the disclosure is not limited thereto).

In some embodiments, the light source 15 may use a light source that contributes to amplifying the energy of the output light, so that the requirements of power generation or illumination are met without consuming too much energy.

Figure 3:
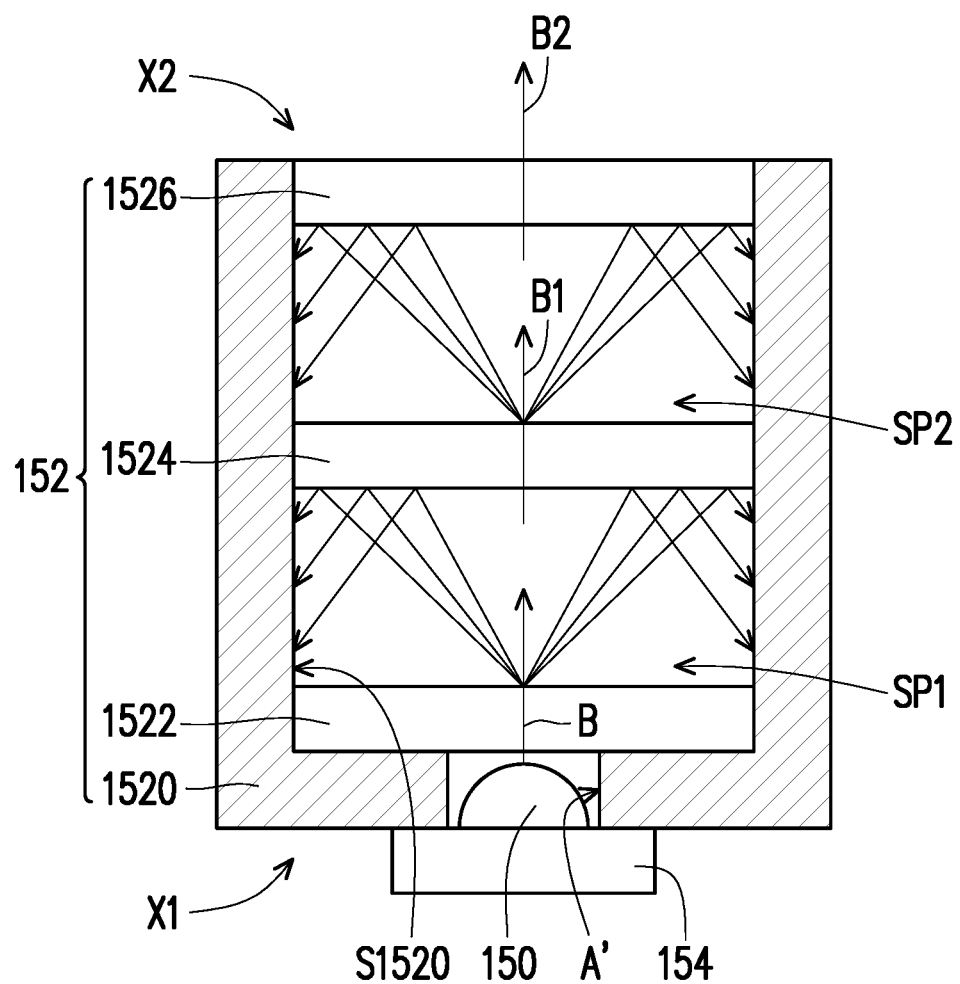
FIG. 3 is a schematic cross-sectional view of the light source of FIG. 1.

FIG. 3 is a schematic cross-sectional view of the light source 15 of FIG. 1. Referring to FIG. 3, the light source 15 includes at least one light-emitting element 150 and an optical device 152. The at least one light-emitting element 150 is adapted to output a beam B. For example, the at least one light-emitting element 150 may include at least one light-emitting diode. In some embodiments, the light source 15 may further include a circuit board 154. The circuit board 100 may be a printed circuit board (PCB), a flexible printed circuit (FPC), or any substrate adapted to carry circuits. The light-emitting element 150 is disposed on the circuit board 154 and electrically connected to the circuit board 154. When the photoelectric device 1 (refer to FIG. 1) is applied to general illumination, the light-emitting diode may be a white light-emitting diode. Alternatively, the light-emitting diode may be a blue light-emitting diode with at least one color conversion layer (not shown). The color conversion layer is adapted to absorb short-wavelength beams (e.g., blue light) and emit long-wavelength beams (e.g., yellow light, red light, or green light). For example, the material of the color conversion layer may include phosphors, quantum dots, or a combination thereof.

The color conversion layer covers the light-emitting diode so that the light-emitting diode is located between the color conversion layer and the circuit board 100. When the light source 15 includes multiple light-emitting diodes, the multiple light-emitting diodes share the same one color conversion layer. Alternately, it is also possible that the multiple light-emitting diodes do not share the same one color conversion layer. For example, the multiple light-emitting diodes may be covered with multiple color conversion layers respectively. The multiple color conversion layers are structurally separated and are excited to emit beams of the same color or different colors. For example, the multiple color conversion layers may be respectively excited to emit red light, green light, and blue light to mix and form white light. In other words, the color of the beam B is white. However, the color of the beam B may be changed according to different requirements, and the specific architecture of the light-emitting diode may be adjusted according to the required color of the beam B.

In the architecture provided with a color conversion layer, the shape of the color conversion layer may be hemispherical to provide a light converging effect, but the disclosure is not limited thereto. In an embodiment, a protective layer may be further disposed on the color conversion layer to isolate the negative effects of air and moisture on the color conversion layer. In the architecture provided with a protective layer, the shape of the protective layer may be hemispherical to provide a light converging effect. In this way, the shape of the color conversion layer may or may not be hemispherical. In addition, in the architecture without a color conversion layer, a hemispherical protective layer may also be disposed on the light-emitting diode to provide a light converging effect.

The optical device 152 is disposed on the transmission path of the beam B and is adapted to amplify the energy of the emitted light and adjust the light pattern of the emitted light. In detail, the optical device 152 includes a conductive chamber 1520, a first optical module 1522, a second optical module 1524, and a third optical module 1526.

The conductive chamber 1520 is adapted to fix the light-emitting element 150, the first optical module 1522, the second optical module 1524, and the third optical module 1526. The conductive chamber 1520 may be an integrally formed single-piece structure, or may be a multi-piece structure formed by assembling multiple pieces, and the multiple pieces may have the same or different materials. In addition to being adapted to fix the light-emitting element 150, the first optical module 1522, the second optical module 1524, and the third optical module 1526, the conductive chamber 1520 is also adapted to serve as an object that receives photons and emits electrons in the photoelectric effect. Therefore, the material of the conductive chamber 1520 includes a conductive material suitable for generating the photoelectric effect and is exemplarily a material having good conductivity. For example, the material of the conductive chamber 1520 may include metal, alloy, graphene, or a combination of at least two of the above, but the disclosure is not limited thereto.

The conductive chamber 1520 has a light-entrance end X1 and a light-exit end X2 opposite to the light-entrance end X1. The light-emitting element 150 is disposed at the light-entrance end X1, so that the beam B output by the light-emitting element 150 enters the conductive chamber 1520 through the light-entrance end X1, and the beam B is output from the conductive chamber 1520 through the light-exit end X2.

In the embodiment, the light-entrance end X1 of the conductive chamber 1520 has a light source accommodating hole A' configured to accommodate the light-emitting element 150, and the light-emitting element 150 is disposed in the light source accommodating hole A'. However, the relative arrangement relationship between the conductive chamber 1520 and the light-emitting element 150 is not limited thereto. For example, the light-emitting element 150 may be disposed entirely in the light source accommodating hole A', but the disclosure is not limited thereto.

Note that the design parameters of the conductive chamber 1520 (e.g., the shape and/or the size of the conductive chamber 1520, the shape and/or the size of the light source accommodating hole A', etc.) may be adjusted according to the requirements, and are not limited to those shown in FIG. 3.

The first optical module 1522, the second optical module 1524, and the third optical module 1526 are fixed in the conductive chamber 1520. FIG. 3 schematically illustrates that the edge of the first optical module 1522, the edge of the second optical module 1524, and the edge of the third optical module 1526 are all fixed on a side wall S1520 of the conductive chamber 1520, but the fixing method and/or the relative configuration relationship between the optical modules and the conductive chamber are not limited thereto. For example, the first optical module 1522, the second optical module 1524, and the third optical module 1526 may be fixed in the conductive chamber 1520 by engagement, locking, adhesion, or other suitable methods. When the conductive chamber 1520 is formed by assembling multiple pieces, the multiple optical modules may be fixed between two adjacent pieces by engagement, locking, adhesion, or other suitable methods.

The first optical module 1522 is adjacent to the light-entrance end X1 and located between the light-entrance end X1 and the second optical module 1524, and the second optical module 1524 is located between the first optical module 1522 and the third optical module 1526. The conductive chamber 1520, the first optical module 1522, and the second optical module 1524 together define a first resonant space SP1. The conductive chamber 1520, the second optical module 1524, and the third optical module 1526 together define a second resonant space SP2. In the embodiment, the refractive index of the light transmission medium in the first resonant space SP1 and the second resonant space SP2 is 1. In other words, the light transmission medium in the first resonant space SP1 and the second resonant space SP2 may be air, and the filling material may not be disposed in the first resonant space SP1 and the second resonant space SP2. In some embodiments, the distance between the first resonant space SP1 and the second resonant space SP2 or their positions may be adjusted according to requirements. In addition, the number of the resonant space may be increased or decreased according to the requirements.

The beam B output by the light-emitting element 150 enters the first resonant space SP1 through the first optical module 1522. The first optical module 1522 may be a light focusing module to converge the beam B output by the light-emitting element 150 into the first resonant space SP1. The light focusing module may include one or more lenses. Each of the one or more lenses may be a spherical or aspherical lens. In addition, the material of each of the one or more lenses may be glass or plastic.

Any one of the second optical module 1524 and the third optical module 1526 includes an optical element that allows a portion of the beam to pass through and reflects another portion of the beam. The optical element may be one or more lenses or a protective cover. Specifically, the elements of the second optical module 1524 and the third optical module 1526 may be selected according to actual requirements (e.g., the application scope), and the element type and/or the quantity of the second optical module 1524 may be the same or different from the element type and/or the quantity of the third optical module 1524. For example, the second optical module 1524 may be a light focusing module including one or more lenses. When the third optical module 1526 is adopted to increase the distance of light projection, the third optical module 1526 may be a light focusing module including one or more lenses. On the other hand, when the third optical module 1526 is adopted to increase the range of illumination, the third optical module 1526 may be a light expanding module including one or more lenses, and the diopter of the light expanding module may be negative. Furthermore, the third optical module 1526 may also be a protective cover to protect the elements located below it. The material of the protective cover may be glass or plastic. In addition, the protective cover may be a flat or curved substrate.

A portion of the beam B entering the first resonant space SP1 (hereinafter referred to as the first portion) is output from the first resonant space SP1 to the second resonant space SP2 through the second optical module 1524, another portion of the beam B entering the first resonant space SP1 (hereinafter referred to as the second portion) may be amplified by resonance through the first resonant space SP1 and output from the first resonant space SP1 to the second resonant space SP2 through the second optical module 1524 after accumulating sufficient energy.

The first portion may be, for example, 60% of the beam B entering the first resonant space SP1, and the second portion may be, for example, 40% of the beam B entering the first resonant space SP1. However, the respective percentages of the first portion and the second portion may be changed according to different design requirements, and the respective percentages of the first portion and the second portion may be changed by adjusting the design parameters (e.g., the curvature, refractive index, distance from other components, etc.) of the first optical module 1522 and the second optical module 1524. For example, by adjusting the design parameters of the first optical module 1522, the light energy distribution of the beam B transmitted to different areas (e.g., the central area and the peripheral area) of the second optical module 1524 may be controlled. In addition, by adjusting the design parameters of the second optical module 1524, the percentages of the first portion (the beam directly passing through the second optical module 1524) and the second portion (the beam reflected by the second optical module 1524) may be controlled.

In the first resonant space SP1, the second portion is reflected by the second optical module 1524 to the side wall S1520 of the conductive chamber 1520, and the side wall S1520 converts photons into electrons based on the photoelectric effect. The electrons eventually release energy in the form of visible light, thus generating a flash. With the design of the first optical module 1522, the second optical module 1524, and the conductive chamber 1520, the beam B (the photons) is reflected/impacted/collided back and forth multiple times in the first resonant space SP1 to excite more electrons to escape from the original orbit, so a light energy amplification effect similar to that of a laser resonance cavity is achieved, so that the energy of a beam B1 output from the first resonant space SP1 exceeds the energy of the beam B entering the first resonant space SP1. To achieve the effect of resonance amplification, the frequency and phase of the beam B emitted by the light-emitting element 150 are adjusted to be the same or mostly the same as much as possible (i.e., to achieve the characteristic of coherence).

Similarly, a portion of the beam B1 (hereinafter referred to as the third portion) entering the second resonant space SP2 through the second optical module 1524 is output from the second resonant space SP2 to the outside of the optical device 152 through the third optical module 1526. Another portion of the beam B1 (hereinafter referred to as the fourth portion) entering the second resonant space SP2 is amplified by resonance through the second resonant space SP2 and output from the second resonant space SP2 to the outside of the optical device 152 through the third optical module 1526 after accumulating sufficient energy. The energy of a beam B2 output from the second resonant space SP2 exceeds the energy of the beam B1 entering the second resonant space SP2. Thereby, the energy of the beam B2 output from the optical device 152 may exceed the energy of the beam B output by the light-emitting element 150.

The third portion may be, for example, 60% of the beam B1 entering the second resonant space SP2, and the fourth portion may be, for example, 40% of the beam B1 entering the second resonant space SP2, but the respective percentages of the third portion and the fourth portion may be changed according to different design requirements, and by adjusting the design parameters (e.g., the curvature, refractive index, distance from other components, etc.) of the second optical module 1524 and the third optical module 1526, the respective percentages of the third portion and the fourth portion may be changed. For relevant descriptions, reference may be made to the foregoing, which is not iterated here.

Note that although it is schematically shown in the optical device 152 in FIG. 3 that the optical device 152 has two resonant spaces, the quantity of resonant spaces included by the optical device is not limited thereto. Since each of the resonant spaces contributes to amplifying the energy of the light emitted, the optical device may only have one resonant space (e.g., the first resonant space). In such an architecture, the optical device may not include the third optical module 1526, which contributes to reducing the overall volume of the optical device. In still another embodiment, the optical device may also have three or more resonant spaces. In such an architecture, the optical device may include more optical modules, so that each of the resonant spaces is collectively defined by two adjacent optical modules and the conductive chamber 1520. Accordingly, the distance of light projection or the range of irradiation is achieved.

In addition, according to the requirements of different optical designs, lenses of different shapes may be adopted. Therefore, the shapes of all optical modules are not limited to a certain shape, but may be circular, square, rectangular, oval, convex on one side, convex on both sides, convex-concave, textured on one side (e.g., pit texture) and untextured on the other side, textured on both sides, planar, planar on one side and curved on the other side, triangular, polygonal, or other shapes. In some embodiments, in addition to glass and plastic, the material of the optical module may also include a transparent or translucent polymer, or the optical module may even be formed from a liquid. In some embodiments, part of the optical materials may be added and formed with various different ore elements or color materials according to the requirements to thereby produce illumination devices having optical outputs of different colors. In other words, it is possible to add different minerals or color materials when manufacturing the optical lens and change the color of the output light using the different minerals or color materials in the optical lens, without the need to mix lights through light-emitting elements of different colors. In some embodiments, according to different uses and designs, a lens of a specific shape may be added to or a lens of a specific shape may be omitted from between the optical modules. It may even suffice to provide only a set of optical lenses to directly work with a metal resonant chamber. However, it may also be necessary to add a considerable number of optical modules or lenses, or increase or decrease their numbers in the original design according to the requirements. For example, the design of the optical module may also be modified or augmented with reference to some principles of a telescope.

Furthermore, the resonant space may be formed in different shapes, or a specific type of element may be additionally provided, such as a metal light mask or a reflective spare part.

The spare part may be made of different materials such as metal, ceramic, plastic, graphene, or various ore elements. The optical module may be made of general glass, may be an optical lens formulated according to a special formula, may be made of a plastic material (e.g., a PC material), or may be made of ceramic, quartz, or more advanced materials. The lens, height, width, or thickness adopted for the optical modules may all be different, but the disclosure is not limited thereto.

In some embodiments, the light source 15 may also have a wireless charging function. In some embodiments, the light source 15 may have a central remote control system. In some embodiments, the light source 15 may be controlled or monitored through the 5G network to save energy. In some embodiments, the light source 15 may be charged or powered through a solar panel or a wireless transmission.

Based on the principle of quantum optics, the output power of the light-emitting diode light source is first amplified and enhanced through the resonant space to a higher energy level, so that the electrons collide with the photons, and each collision generates more energy. Therefore, the light source 15 contributes to amplifying the energy of the output light. In addition, since the phase and frequency of the beam B2 output from the light source 15 are the same or mostly the same, the light intensity of the beam B2 output from the light source 15 is more uniform. In addition, the beam B2 output by the light source 15 is amplified again through the chamber C in FIG. 1, so that the power generation of the solar panel in the photoelectric device 1 is effectively increased, and when the bottom plate 14 is a light-transmitting plate, the illumination requirements (e.g., increasing the brightness of the illumination, the distance of the light projection, or the range of the illumination, etc.) are met without consuming more energy (without increasing the output power of the light-emitting diode).

Figure 4:
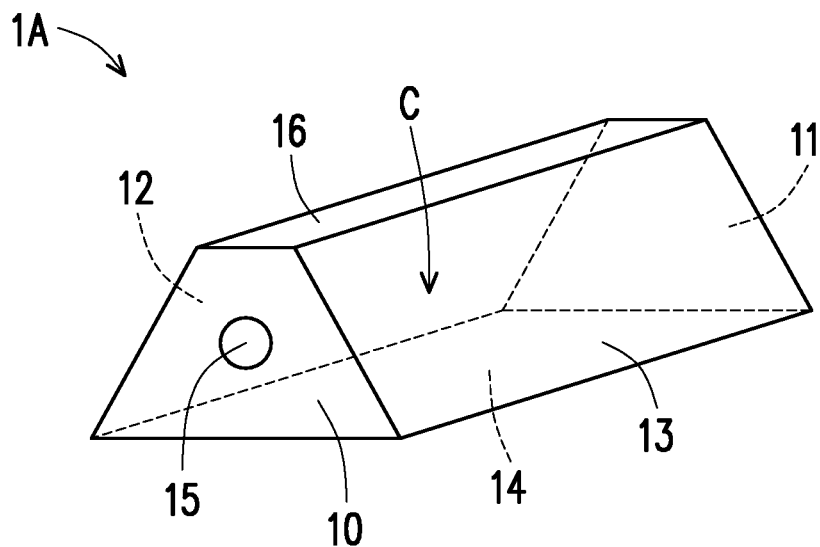
FIG. 4 to FIG. 6 are schematic views of photoelectric devices according to the second embodiment to the fourth embodiment of the disclosure, respectively.
Figure 5:
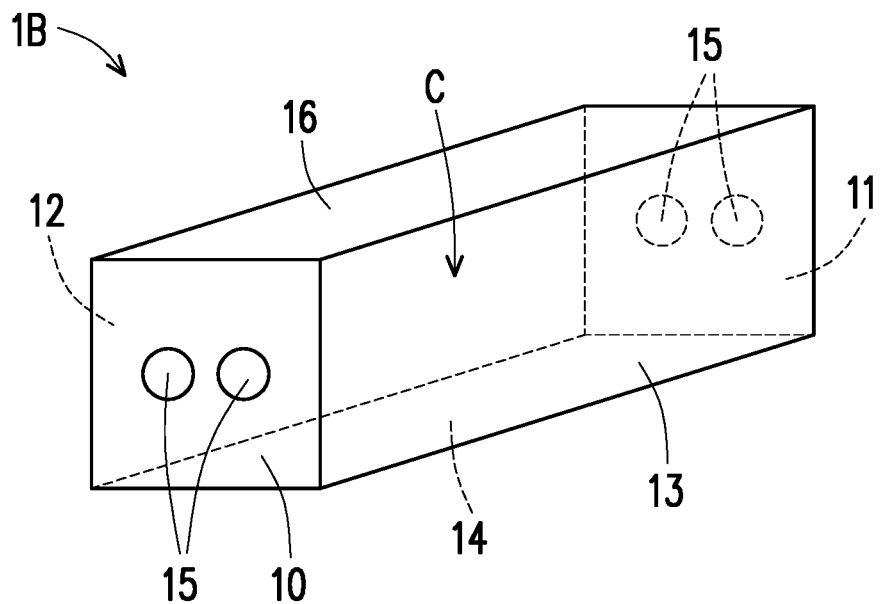
Figure 6:
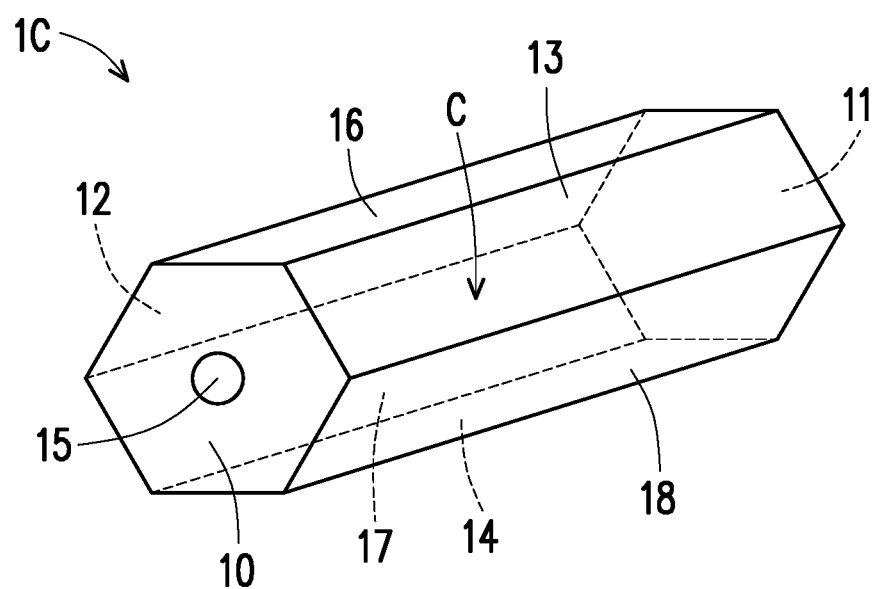

Note that the quantity of the solar panels, the quantity of the reflective plates, the relative arrangement relationship between the solar panels and the reflective plates in the photoelectric device, and the appearance of the photoelectric device may be changed according to the requirements. FIG. 4 to FIG. 6 are schematic views of the photoelectric device 1A according to the second embodiment of the disclosure to the photoelectric device 1C according to the fourth embodiment of the disclosure, respectively.

Referring to FIG. 4, the photoelectric device 1A has six plates including the front plate 10, the back plate 11, the first side plate 12, the second side plate 13, the bottom plate 14, and a top panel 16. The six plates are fixed together by engagement, locking, adhesion, or other suitable methods to be in the form of a trapezoidal cylinder as shown in FIG. 4. The top plate 16 is, for example, connected between the first side plate 12 and the second side plate 13 and opposite to the bottom plate 14, but the disclosure is not limited thereto. In some embodiments, the top plate 16 may be a reflective plate. In some embodiments, the top plate 16 may not be embedded with the light source 15. In other embodiments, the top plate 16 may be embedded with one or more light sources.

Referring to FIG. 5, a photoelectric device 1B also has six plates including the front plate 10, the back plate 11, the first side plate 12, the second side plate 13, the bottom plate 14, and the top plate 16. The six plates are fixed together by engagement, locking, adhesion, or other suitable methods to be in the form of a cuboid as shown in FIG. 5.

The photoelectric device 1B may include multiple light sources 15, and each of the front plate 10 and the back plate 11 may respectively be embedded with multiple light sources 15. In other embodiments, each of the reflective plates in the photoelectric device 1B may be embedded with one or more light sources 15 or without the light source 15.

Referring to FIG. 6, the photoelectric device 1C has eight plates including the front plate 10, the back plate 11, the first side plate 12, the second side plate 13, the bottom plate 14, the top plate 16, a third side plate 17, and a fourth side plate 18. The eight plates are fixed together by engagement, locking, adhesion, or other suitable methods to be in the form of a hexagonal cylinder as shown in FIG. 6. The third side plate 17 is, for example, connected between the first side plate 12 and the bottom plate 14, and the fourth side plate 18 is, for example, connected between the second side plate 13 and the bottom plate 14. In some embodiments, each of the third side plate 17 and the fourth side plate 18 may be a solar panel or a reflective plate, and the reflective plate may be embedded with one or more light sources or without the light sources.

In other embodiments, the photoelectric device may also be in the form of other polygonal cylinders, such as octagonal cylinders, but the disclosure is not limited thereto. In addition, multiple sides of the polygonal cylinder may be of equal length or unequal length.

In addition, in any embodiment of the disclosure, even if only one solar panel is adopted, along with the light source 15, the photoelectric device still generates currents and voltages. Of course, according to different requirements, the number of solar panels in the photoelectric device may be one or more, such as two, three or more.

Based on the above, in the photoelectric device of the embodiments of the disclosure, the beam output by the light source enters the chamber, and the energy of the beam entering the chamber is amplified through reflection and diffraction, so the photoelectric device of the embodiments of the disclosure contributes to amplifying the energy of the output light, so that the requirements of power generation or illumination are met without consuming more energy.

Although the disclosure has been described with reference to the above embodiments, it will be apparent to one of ordinary skill in the art that modifications to the described embodiments may be made without departing from the spirit and the scope of the disclosure.

Accordingly, the scope of the disclosure will be defined by the attached claims and their equivalents and not by the above detailed descriptions.

What is claimed is:

1. A photoelectric device, comprising:
   at least five plates, assembled together to form a chamber, wherein at least one of the at least five plates comprises a solar panel capable of generating a photoelectric effect, and at least another one of the at least five plates comprises a reflective plate or a light-transmitting plate; and
   at least one light source embedded in at least one of the at least five plates that is different from the at least one of the at least five plate comprising the solar panel,
   wherein a light receiving surface of the solar panel faces an inside of the chamber so that the light receiving surface of the solar panel is able to receive a portion of a light beam output from the at least one light source,
   wherein the at least one light source comprises:
     at least one light-emitting element adapted to output a beam; and
     an optical device disposed on a transmission path of the beam and comprising:
       a conductive chamber with a light-entrance end and made of conductive material capable of generating a photoelectric effect;
       a first optical module fixed in the conductive chamber and adjacent to the light-entrance end;
       a second optical module fixed in the conductive chamber, wherein the first optical module is located between the light-entrance end and the second optical module, and the conductive chamber, the first optical module, and the second optical module together define a first resonant space in which a portion of the beam is subjected to reflection, diffraction and photoelectric conversion; and
       a third optical module fixed in the conductive chamber, wherein the second optical module is located between the first optical module and the third optical module, and the conductive chamber, the second optical module, and the third optical module together define a second resonant space in which another portion of the beam is subjected to reflection, diffraction and photoelectric conversion.

2. The photoelectric device according to claim 1, wherein the chamber is hollow.

3. The photoelectric device according to claim 1, wherein at least one plate in the photoelectric device is a composite plate.

4. The photoelectric device according to claim 1, wherein the photoelectric device is in a form of a polygonal cylinder, and the at least five plates comprise a front plate, a back plate, a first side plate, a second side plate, and a bottom plate, wherein the front plate and the back plate are the reflective plates, the first side plate and the second side plate are the solar panels, and the bottom plate is the solar panel, the reflective plate, or the light-transmitting plate.

5. The photoelectric device according to claim 4, wherein the photoelectric device is an illumination device, and the bottom plate is a light-transmitting plate.

6. The photoelectric device according to claim 1, wherein the at least one light-emitting element comprises at least one light-emitting diode.

* * * * *